US010983627B2

(12) United States Patent
Baker

(10) Patent No.: US 10,983,627 B2
(45) Date of Patent: Apr. 20, 2021

(54) BIOMETRIC INFORMATION-BASED TOUCH CONTACT CLASSIFICATION

(71) Applicant: HEWLETT-PACKARD DEVELOPMENT COMPANY, L.P., Spring, TX (US)

(72) Inventor: Abu Baker, Spring, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/340,289

(22) PCT Filed: Feb. 15, 2017

(86) PCT No.: PCT/US2017/017873
§ 371 (c)(1),
(2) Date: Apr. 8, 2019

(87) PCT Pub. No.: WO2018/151711
PCT Pub. Date: Aug. 23, 2018

(65) Prior Publication Data
US 2019/0370521 A1 Dec. 5, 2019

(51) Int. Cl.
G06F 3/044 (2006.01)
G06F 3/0488 (2013.01)
(Continued)

(52) U.S. Cl.
CPC ........ G06F 3/0416 (2013.01); G06F 3/04883 (2013.01); G06F 3/04886 (2013.01); G06K 9/0002 (2013.01)

(58) Field of Classification Search
None
See application file for complete search history.

(56) References Cited

U.S. PATENT DOCUMENTS 8,773,390 B1 * 7/2014 Clark ..................... G06F 3/044
345/174
9,144,545 B2 9/2015 Horlacher et al.
(Continued)

FOREIGN PATENT DOCUMENTS

WO WO-2015160752 A1 10/2015

OTHER PUBLICATIONS

Shu, K., Understanding and Rejecting Errant Touches on Multi-touch Tablets, 2013, < https://ink.library.smu.edu.sg/cgi/viewcontent.cgi?article=1089&context=etd_coll >.

Primary Examiner — Krishna P Neupane
(74) Attorney, Agent, or Firm — Trop, Pruner & Hu, P.C.

(57) ABSTRACT

An example method includes sensing a first touch event on a touch sensitive surface of a computing device, where the first touch event is associated with a touch contact; and classifying the touch contact as being a finger contact or a palm contact based on biometric information. The method includes providing an input to the computing device based on the classification of the touch contact; and associating the first touch event with a time sequence of touch events that are associated with the touch contact. The method includes, based on a feature of the time sequence of touch events, selectively reclassifying the touch contact; and selectively changing the input based on a result of the selective reclassification of the touch contact.

20 Claims, 5 Drawing Sheets

(51) Int. Cl.
  *G06K 9/00* (2006.01)
  *G06F 3/041* (2006.01)

(56) References Cited

U.S. PATENT DOCUMENTS

| | | | |
|---|---|---|---|
| 2009/0095540 A1* | 4/2009 | Zachut | G06F 3/0418 |
| | | | 178/18.03 |
| 2009/0244031 A1* | 10/2009 | Westerman | G06F 3/04883 |
| | | | 345/174 |
| 2012/0262407 A1 | 10/2012 | Hinckley et al. | |
| 2014/0104191 A1 | 4/2014 | Davidson et al. | |
| 2014/0333328 A1* | 11/2014 | Nelson | G06K 9/0002 |
| | | | 324/663 |
| 2016/0110024 A1 | 4/2016 | Townsend et al. | |
| 2016/0291760 A1 | 10/2016 | Fleck et al. | |
| 2016/0320905 A1 | 11/2016 | Harrison et al. | |
| 2017/0024073 A1* | 1/2017 | Schwarz | G06F 3/0418 |

* cited by examiner

BIOMETRIC INFORMATION-BASED TOUCH CONTACT CLASSIFICATION

BACKGROUND

A computer may have many human interface devices (HIDs), for purposes of providing input and controlling operations of the computer. One such HID is a direct touch display, or "touch screen," which a user may physically contact to provide input through the use of touch gestures (swipes or contacts with one or multiple fingers with the touch screen, for example).

DETAILED DESCRIPTION

Figure 1:
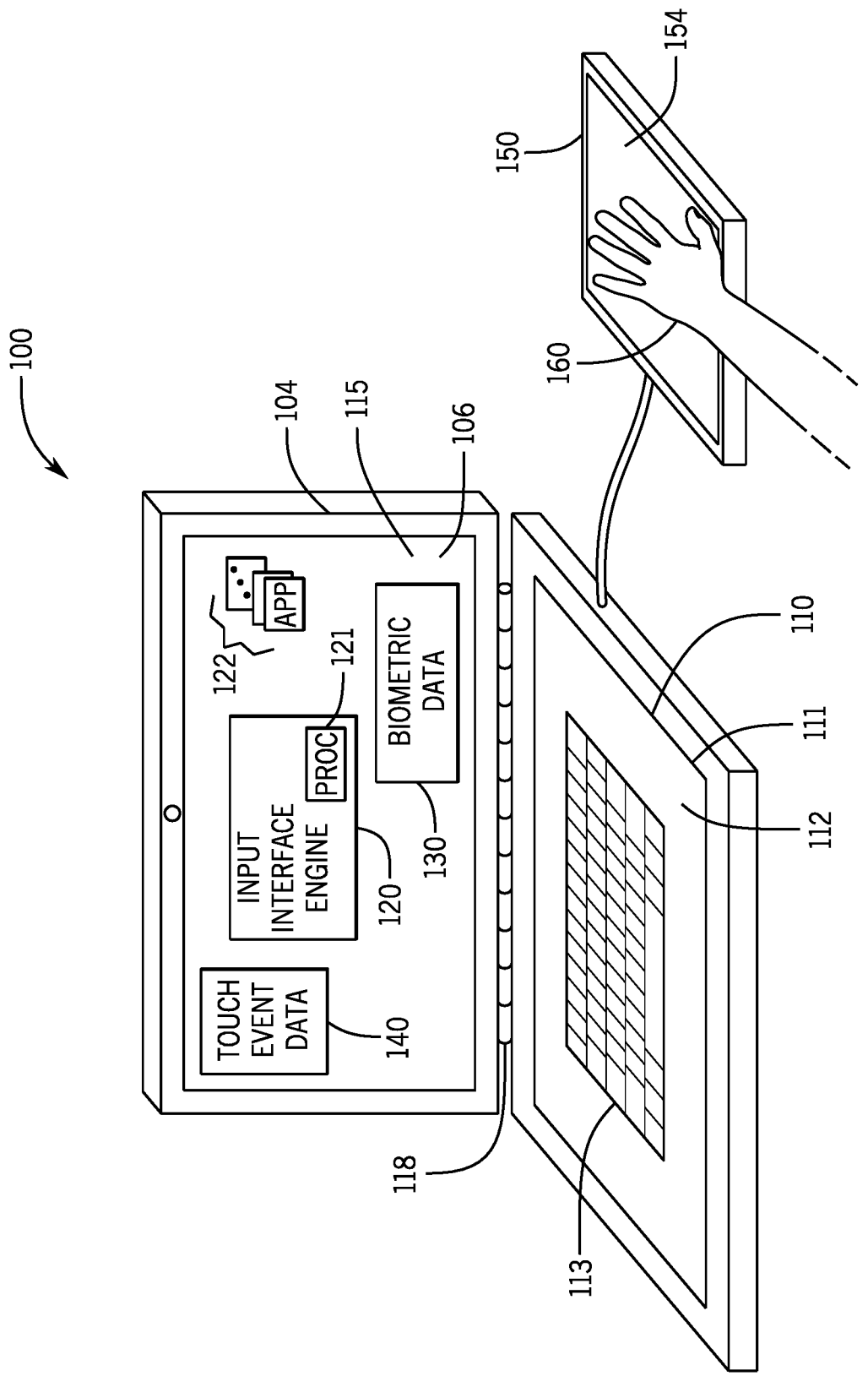
FIG. 1 is a perspective view of a portable computing device according to an example.

A direct touch display, or "touch screen," of a computing device (a portable computing device, for example) may improve a user's experience with the computing device and improve the productivity that the human may achieve using the computing device. One way to use a touch screen is to physically contact the touch screen with one or multiple fingers to provide corresponding touch gestures that the computing device senses and interprets as input for the computing device.

The computing device may wrongly interpret inadvertent touches, such as palm contacts with the touch screen, as input. Therefore, one way to avoid such inadvertent input is for the user to use hand positions in which the user's palms do not contact the touch screen. However, the user assuming hand positions or postures to deliberately avoid palm contacts may reduce productivity and may cause stress or fatigue for the user. Another way to avoid inadvertent input due to palm contact is for the computing device to process touch contacts with the touch screen in a way that identifies palm contacts and rejects these contacts as inputs. Due to the computing device rejecting palm contact input, the user's shoulder load may be reduced by allowing the user to rest palms on the touch screen while providing input with the user's fingers. In addition to reducing shoulder load, resting palms on the touch screen may have such beneficial effects as increasing productivity by allowing the user to better register fingertips with the touched content (keys of a virtual keyboard, for example).

In accordance with examples that are described herein, a computing device uses both biometric information and spatiotemporal (i.e., spatial varying and time varying) observations about touch contacts with a touch screen to in interpret touch contacts with a touch screen so that finger contacts are interpreted as input for the computing device and palm contacts are rejected as input.

More specifically, in accordance with examples, a computing device may access such biometric information as data that represents biometric features of the user's hands, such as biometric information that is derived from scanned images of the user's hands. In this manner, in accordance with examples, biometric information may represent ridge flows, or patterns, of distinct parts of the user's hands so that by comparing an image of a given touch contact by the user with the touch screen to the biometric information, the computing device may derive perform an initial classification of the touch contact. In this context, a "touch contact" refers to a physical interaction between a touch sensitive surface (such as the touch sensitive surface of a touch screen) and a part of a user's hand (the touching of the touch screen by a user's finger, wrist or palm, as examples), and which occurs over a certain interval of time. In this manner, a touch contact may be, as examples, a swiping touch gesture in which a user contacts the touch screen with a finger and moves, or swipes, the finger over a particular path on the touch screen; a single tap of the touch screen by a finger; a double tap by a finger on the touch screen; and so forth. As such, the touch contact may be associated with a time sequence of one or multiple touch events. In this context, a "touch event" refers to an observed instance of a physical contact with the touch sensitive surface (the surface of the touch screen, for example). In general, a touch event is associated with a contact area (i.e., the area of contact between the hand and touch sensitive surface), and the touch event is associated with a contact image representing the sensed contact area between the user's hand and the touch sensitive surface. Thus, a touch contact (a swiping finger gesture, a palm contact, a finger tap, and so forth) may be represented by a time sequence of one or multiple touch events.

In accordance with examples, the computing device initially classifies a given touch contact as being associated with a finger contact or a palm contact based at least in part on biometric data. In this context, a "finger contact" refers to the contact between a user's finger and the touch screen over a time sequence of one or multiple touch events; and a "palm contact" refers to a contact associated with a part of the hand other than the finger (e.g., the palm or the wrist).

As a more specific example, the computing device may initially classify a given touch contact as being associated with a left index finger of the user based on a determination that one or multiple contact images match ridge flows, or patterns, of the user's left finger match ridge flows, or patterns, of a scan of the user's left finger, as represented by biometric data. In this manner, every finger has a unique ridge flow, or pattern, and the biometric data represents features or characteristics, or the ridge flows learned from the user's hands, and accordingly, the unique ridge flows or patterns on a user's hands may be used to uniquely identify parts of the user's hand, such as the right index finger, the left thumb, a palm, and so forth. The matching of a given contact image to the parts of the user's hand may be performed in a number of different ways, depending on the particular implementation. For example, in accordance with some implementations, the computing device may use machine based-classification that classifies a given contact image as being associated with a part of the user's right or left hand based on features of the ridge flows present in the contact image. Such a classification may not always be correct, however, as a given contacting portion of the user's hand may not contact the touch screen exactly in the same manner as the portions of the user's hand when scanned.

Therefore, in accordance with examples, the computing device uses spatiotemporal-based observations to refine the initial classification.

In this manner, in accordance with examples, the computing device may associate a first touch event (associated with a particular touch contact) with a time sequence of one or multiple other time events that are also associated with the same touch contact. Based on spatiotemporal features of the time sequence of touch events, the computing device may selectively reclassify the touch contact. In this manner, as further described herein, in accordance with examples, the spatiotemporal features of the touch events associated with a particular touch contact may be analyzed for purposes of discriminating touch contacts associated with a finger from, for example, touch contacts associated with a palm. This allows the computing device to accept inputs from the user's fingers and reject contact inputs associated with the user's palm.

By observing spatiotemporal features of touch events, the computing device is able to discriminate finger from palm contacts due to the manner in which these two categories of contacts vary in time and space. For example, the overall touch area for a palm (which may be associated with multiple contact points and areas) tends to be larger than the contact area for a finger. For most touch screens, the relatively large palm contact area may be segmented into a collection of touch points, which often flicker in and out. Palm points tend to be clustered together, whereas a finger contact may be isolated. Finger contacts have a consistent area, unlike palms, which change in area as the palms form against the touch screen. A palm touch contact may be associated with relatively small motion, whereas a finger contact may be associated with a relatively longer and smoother trajectory on the touch screen. As such, the spatiotemporal characteristics, or features, of touch events may be used, as described herein, for purposes of recognizing these characteristics that differentiate palm contacts from finger contacts.

Another insight is that there may often by significant context that existed before a given finger or palm touch occurs. For example, when dotting an "i," a finger touch may exist for a relatively short interval of time, such as 50 milliseconds (ms) time interval, whereas a palm may contact the touch screen for several seconds. As such, touch events occurring before a given detected touch event may be included as context to for purposes of discriminating between palm and finger contacts. Therefore, as the computing device records the touch event data, the computing device may determine the spatiotemporal features of touch events backwards in time to make a more confident classification.

As a more specific example, FIG. 1 depicts an example portable computing device 100 in accordance with some implementations. For this example, the computing device 100 is a multiple display computer that includes multiple touch screens, such as a touch screen 115 that is associated with a display panel unit 104 and has a touch sensitive surface 106 for displaying images and receiving touch input; and a touch screen 111 that is associated with a display panel unit 110 and has a touch sensitive surface 112 for displaying input and receiving touch input. For this example, the display panel units 104 and 110 may be connected together by a hinge connection 118. In this regard, as an example, in accordance with some implementations, the computing device 100 may regulate user interfaces that are displayed on a particular display panel based on a device mode of the computing device 100. In this manner, the device mode refers to a configuration of the computing device 100 based on how the display panels 104 and 110 are physically configured relative to each other. For example, the display panel units 104 and 110 may be physically positioned, as depicted in FIG. 1, in a clamshell orientation (an orientation in which the computing device 100 functions similar to a laptop computer); in a tablet orientation; and so forth.

In accordance with further examples, the portable computing device may be any electronic device that contains one or multiple touch sensitive surfaces, such as, a tablet computer, a notebook or desktop computer containing a touch screen, a smartphone, and so forth. Moreover, the touch sensitive surface may, in general, be a surface that is associated with capacitive-based touch screen, a resistive-based touch screen, a projective capacitive-based touch screen, a surface acoustic wave (SAW)-based touch screen, and so forth. Regardless of its particular form, the touch sensitive surface is constructed to sense physical contact with the surface and acquire images of touch events, which allows the computing device 100 to assess biometric and spatiotemporal features associated with the touch events to interpret input for the computing device 100. In this manner, in accordance with examples, the computing device 100 may process data representing the touch event images to reject input (i.e., associated touch events) associated with palm contacts with the touch sensitive surface, and accept and further interpret input associated with finger contacts with the touch sensitive surface.

For the specific example of FIG. 1, the touch screen 111 provides a graphical user interface (GUI), which projects one or multiple images, with which a user may interact by physically touching portions of the touch screen 111 with parts of one or both hands. For the specific example of FIG. 1, the GUI is a virtual keyboard 113. However, a given GUI may be associated with other images that are displayed on the touch screen 111, in accordance with further examples. Regardless of the particular GUI, the user may rest the user's palms on the touch screen 111 as well as interact with the GUI using finger gestures (finger taps, finger double taps, swiping finger gestures, and so forth). It is noted that although physical interaction between the touch screen 111 and the user is specifically discussed herein, a user may similarly physically interact with the touch screen 115 to provide touch-based input (based on the device mode of the computing device 100).

For purposes of detecting, classifying and therefore interpreting input acquired using interaction with the touch screens 111 and 115, the computing device 100 includes an input interface engine 120. In general, in accordance with some implementations, the input interface engine 120 is a processor-based engine. In this manner, in accordance with some implementations, the input interface engine 120 may contain a hardware processor 121 (one or multiple central processing units (CPUs), one or multiple CPU cores, and so forth) that executes machine executable instructions, or "software," for purposes of interpreting and classifying touch contacts with the touch sensitive surfaces 106 and 112 of the touch screens 111 and 115, respectively, so that the input interface engine 120 may provide the corresponding input for components of the computing device 100, such as applications 122.

For purposes of interpreting and classifying touch events with the touch screens 111 and 115, the input interface engine 120 may, in accordance with some implementations, rely on touch event data 140 and biometric data 130. In accordance with examples, the biometric data 130 may represent biometric information about certain physical characteristics of the hand or hands of a user that is physically interacting with the touch screen 111 or 115. In this regard, in accordance with some implementations, the computing device 100 may be acquire the biometric data 130 through the use of an electronic scanner 150 that contains a scanning surface 154 on which a user may place a hand for purposes of allowing the computing device 100 to scan an image of the user's hand, such as example image 200 of the user's left hand that is illustrated in FIG. 2.

Figure 2:
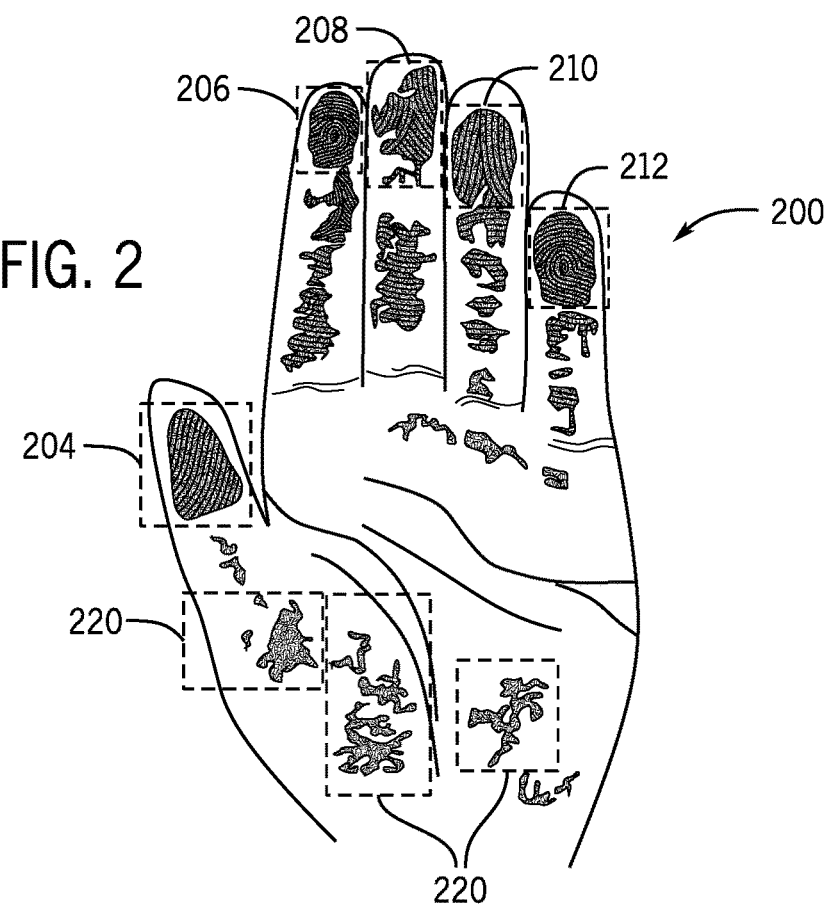
FIG. 2 is an image of a hand illustrating the parsing of the image into subimages associated with different parts of the hand according to an example.

Referring to FIG. 2 in conjunction with FIG. 1, in accordance with examples, the input interface engine 120 (or other entity, depending on the particular implementation) may, process data representing the scanned user hand, parse the image into distinct regions associated with the parts of the user's hand. For example, for the left hand image 200 of FIG. 2, the input interface engine 120 may parse the image 100 into regions 204, 206, 208, 210 and 212 that are associated with the user's thumb, index finger, middle finger, ring finger and small finger, respectively, and store corresponding data representing these parts of the user's hand. Moreover, the input interface engine 120 may also parse one or multiple regions 220 from the left hand image 200, which are associated with palm contact(s) for the user's left hand that store corresponding data representing non-finger parts of the user's left hand. In a similar manner, the user may scan a right hand image that the input interface engine 120 (or other entity) may parse into distinct hand regions, or parts, into and stores as the biometric data 130. In accordance with some implementations, the biometric data 130 may contain biometric data for multiple users; and the input interface engine 120 may select the appropriate data based on recognition (login credentials, biometric-based recognition, and so forth) of a particular user using the computing device 100.

Using the biometric data 130, the input interface engine 120 may determine (determine using machine-based classification trained on the biometric data 130, for example) that one or multiple contacts (each resulting in a particular touch event) are associated with a particular part of the user's hand, and accordingly, the input interface engine 120 may associate that the corresponding touch events with the same touch contact. For example, the input interface engine 120 may associate multiple touch events as being associated with the user's left index finger. The touch events are represented by touch event data 140.

Thus, in accordance with examples, the input interface engine 120 makes an initial classification of a touch contact based on the biometric data 130. The input interface engine 120 may then observe spatiotemporal characteristics of the touch events for a given associated touch contact, as well as spatiotemporal features for touch events associated with different touch contacts, for purposes of refining the initial classification. As described further herein, the refinement of the initial classification may involve changing the classification of a given touch contact from being a finger contact to being a palm contact, and vice versa.

Figure 3:
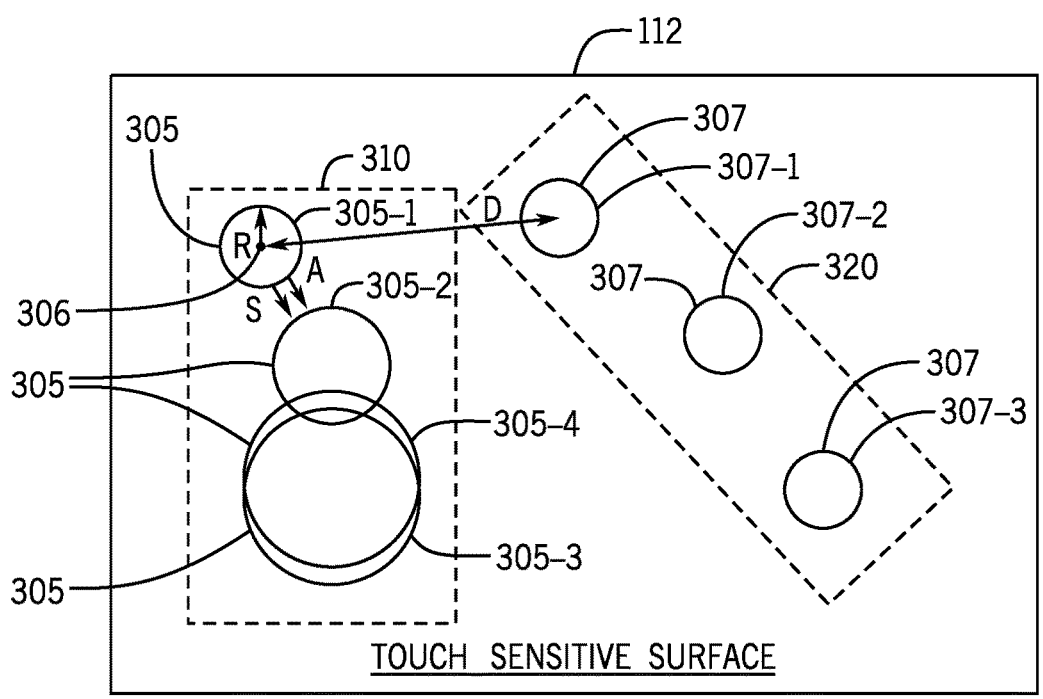
FIG. 3 is an illustration of touch event sequences associated with multiple touch contacts according to an example.

FIG. 3 illustrates touch events that are associated with two exemplary touch contacts 310 and 320. In particular, the touch contact 310 is associated with a time sequence of touch events 305, where the suffixes "1" to "4" associated with reference numeral 305 denotes the time order of the touch events 305 in the time sequence. For example, the touch event 305-1 occurs first in time, the touch event 305-2 occurs second in time, and so forth. The exemplary touch contact 320 is associated with a time sequence of touch events 307. Referring to FIG. 3 in conjunction with FIG. 1, in accordance with examples, the input interface engine 120 (FIG. 1) initially classifies the touch contacts 310 and 320 based on the biometric data 130 and thereafter observes a series of spatiotemporal features that characterize the touch events 305 and 307 and their relationships to neighboring touch events 305 and 307.

More specifically, in accordance with examples, the input interface engine 120 compares the spatiotemporal features of the touch events corresponding to a particular touch contact and occurring over an associated window of time centered at time t=0 (i.e., the birth of the first recognized event of a given touch contact). In accordance with examples, the input interface engine 120 expands the time window symmetrically about time t=0, to ensure that the input interface engine 120 considers data pertaining to touch events that occur before and after the birth event. For example, in accordance with some implementations, for the touch contact 320 of FIG. 3, the input interface engine 120 may initially regard touch event 307-2 as being the initial touch event that is associated with the touch contact 320 and expand the touch events for the touch contact 320 to include the prior touch event 307-1 and include a subsequent touch event 307-3.

In accordance with examples, a given touch event has an associated contact area (corresponding the sensed contact image), which has an associated centroid position. As a specific example, the touch event 305-1 of FIG. 3 has a contact image having a centroid position 306 and an associated radius R, which indicates the maximum distance from the centroid to the perimeter of a touch area associated with the touch event 305-1. It is noted that a given touch event may have a non-circular contact area (and image), in accordance with examples.

In accordance with examples, the input interface engine 120 determines statistics pertaining to observed spatiotemporal features of the touch events. For example, the statistics may include the mean, or average; minimum; and maximum; of, spatiotemporal features associated with each touch event and associated with a particular time window that defines the time sequence of touch events associated with a given touch contact. As examples, the spatiotemporal features for a given touch event may include a size that is associated with the touch event (the radius of the touch event, for example), as well as feature that represent a motion that is associated with the touch event (a speed and/or an acceleration of the touch event, as illustrated by Speed S and Acceleration A vectors for the touch event 305-1 in FIG. 3, for example).

Moreover, in accordance with examples, the input interface engine 120 may determine such spatiotemporal feature statistics as the total number of touch events in a given time sequence (i.e., the number of observed touch events associated with a given touch contact); and the mean/minimum/maximum Cartesian distances between the centroid of a given touch event at time t=0 and all touch events in any concurrent sequences (belonging to other touch contacts, as depicted by the distance D between touch events 305-1 and 307-1 in FIG. 3, for example). In accordance with examples, the spatiotemporal features are rotation and flip and invariant for purposes of minimizing the effect of device and hand orientation as well as handedness on classification.

In accordance with examples, the input interface engine 120 uses machine based classification to classify a particular touch contact as being a finger contact or palm contact based on one or multiple of the spatiotemporal statistics (i.e., the features for the classification) that are described herein. In this manner, in accordance with examples, the machine-based classification may use a classification model that is trained using spatiotemporal features observed from known touch contacts with fingers and palms.

In accordance with examples, the input interface engine 120 records all touch events that occur with the touch screen 111. After a given touch contact has been "alive" for a predetermined duration of time (a time interval of 25 ms, for example), the input interface engine 120 may classify the touch contact as being either a "finger" or a "palm." In this manner, the touch contact being "alive" refers to touch events associated with the touch events occurring over the predetermined duration of time.

In accordance with some implementations, the initial classification by the input interface engine 120 may be based on a comparison of the contact image associated with the initial touch event or touch events with the biometric data 130 (FIG. 1) for purposes of classifying (a machine-based classification, for example) the associated touch contact based on detected finger ridge flows, or patterns, associated with the contact image.

In accordance with examples, if a given touch contact terminates before the initial time window (25 ms, for example) then the input interface engine 120 classifies the touch contact using all available data, including available biometric data. At a longer time after birth (a 50 ms window, for example) the input interface engine 120 may perform another classification, such as a classification based on observed spatiotemporal features of the touch events associated with the touch contact. Moreover, in accordance with examples, for subsequent time intervals (50 ms intervals, for example) thereafter, the input interface engine 120 may repeat the reclassification, with the initial classification and each reclassification contributing a single vote representing whether the touch contact is a finger or palm. This process may continue for a predetermined duration (a duration of 500 ms, for example). In this regard, by tallying the votes, i.e., votes of either a "palm" or a "finger," the input interface engine 120 may finally classify the touch contact as either being associated with a finger or a palm. Thus, after the expiration of a predetermined time interval (the 500 ms time interval, for example) or if the input interface engine 120 determines that the touch contact has ceased (the input interface engine 120 determines that no more touch events associated with the touch contact have occurred for a certain interval of time, such as 100 ms, for example), whichever comes first, then the voting stops; and the input interface engine 120 uses the current/final vote to assign a permanent classification to the touch contact. It is noted that the vote implicitly encodes a confidence score, which may be used for a probabilistic input system.

A particular benefit of the iterative classification approach described herein is that the computing device 100 may show immediate feedback to the user of the computing device 100 (FIG. 1). In this manner, in accordance with some implementations, the input interface engine 120 may initially interpret input based on an initial best "guess," and the input interface engine 120 may later refine this guess (and correspondingly change its interpretation of the data) as more information becomes available. For example, if a given touch contact is initially "guessed" to be a finger, then the corresponding input may be provided to an application 122 so that the application, may, for example, render a stroke on a drawing canvas on the touch screen 111. If, the input interface engine 120 later changes the classification so that the touch contact is no longer classified as being a finger, then, in accordance with examples, the input interface engine 120 may change the input so that the application 122 correspondingly removes the stroke from the canvas.

Figure 4:
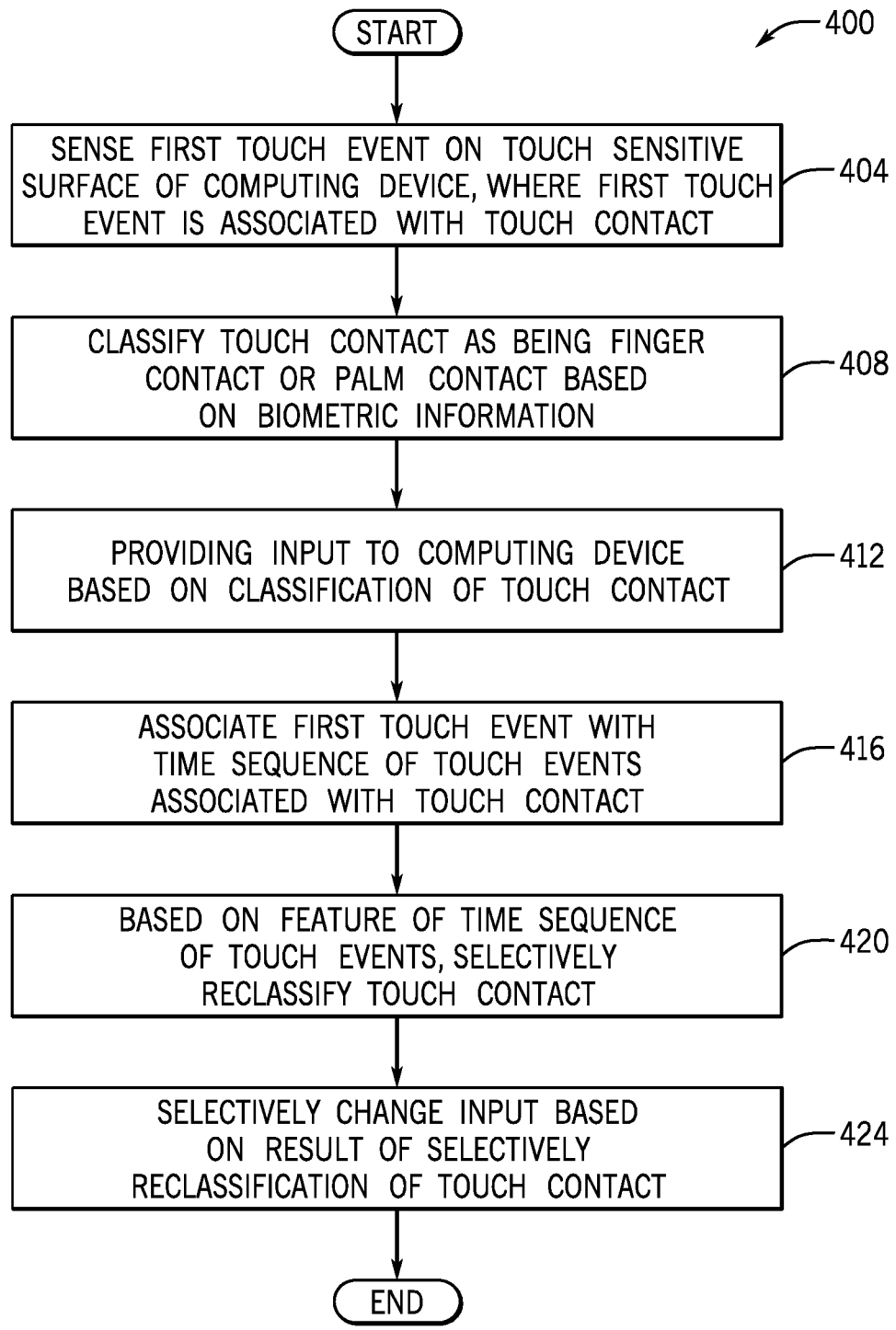
FIGS. 4 and 5 are flow diagrams depicting techniques to interpret touch contacts with a touch screen using biometric and spatiotemporal information according to examples.

Thus, referring to FIG. 4, in accordance with examples, the input interface engine 120 may perform a technique that is depicted in FIG. 4. Referring to FIG. 4 in conjunction with FIG. 1, pursuant to the technique 400, the input interface engine 120 may sense (block 404) a first touch event on a touch sensitive surface of a computing device, where the first touch event is associated with a touch contact. The input interface engine 120 may classify (block 408) the touch contact as being a finger contact or a palm contact based on biometric information and provide (block 412) an input to the computing device based on the classification of the touch contact. The technique 400 includes associating (block 416) the first touch event with a time sequence of touch events that are associated with the touch contact and based on a feature of the time sequence of touch events, selectively reclassifying (block 420) the touch contact. In accordance with examples, the input interface engine 120 selectively changes the input based on a result of the selective reclassification, pursuant to block 424.

Figure 5:
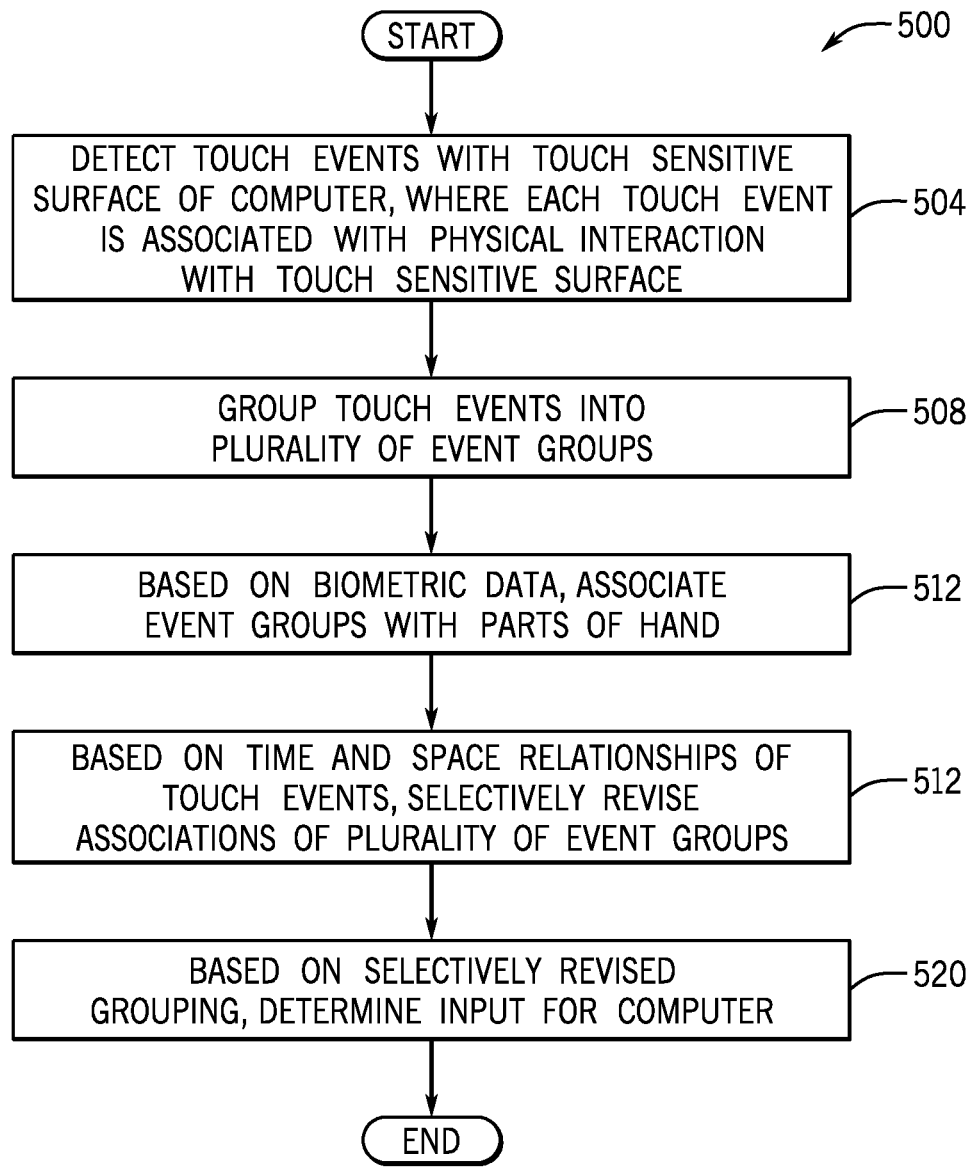

Moreover, referring to FIG. 5, in accordance with examples, a technique 500 includes detecting (block 504) touch events with a touch sensitive surface of a computer, where each touch event is associated with a physical interaction with the touch sensitive surface. The technique 500 includes grouping (block 508) the touch events into a plurality of event groups and based on biometric data, associating (block 512) the event groups with parts of a hand. The technique 500 includes selectively revising the associations of the plurality of event groups based on time and space relationships of the touch events, pursuant to block 516, and determining an input for the computer based on the selectively revised grouping, pursuant to block 520.

Thus, in accordance with examples, in response to the input interface engine 120 associating a given touch event group with a palm contact (associating a given time sequence of touch events with a palm contact, for example), the input interface engine 120 may reject the touch events associated with the given touch event group as providing input for a computer.

Figure 6:
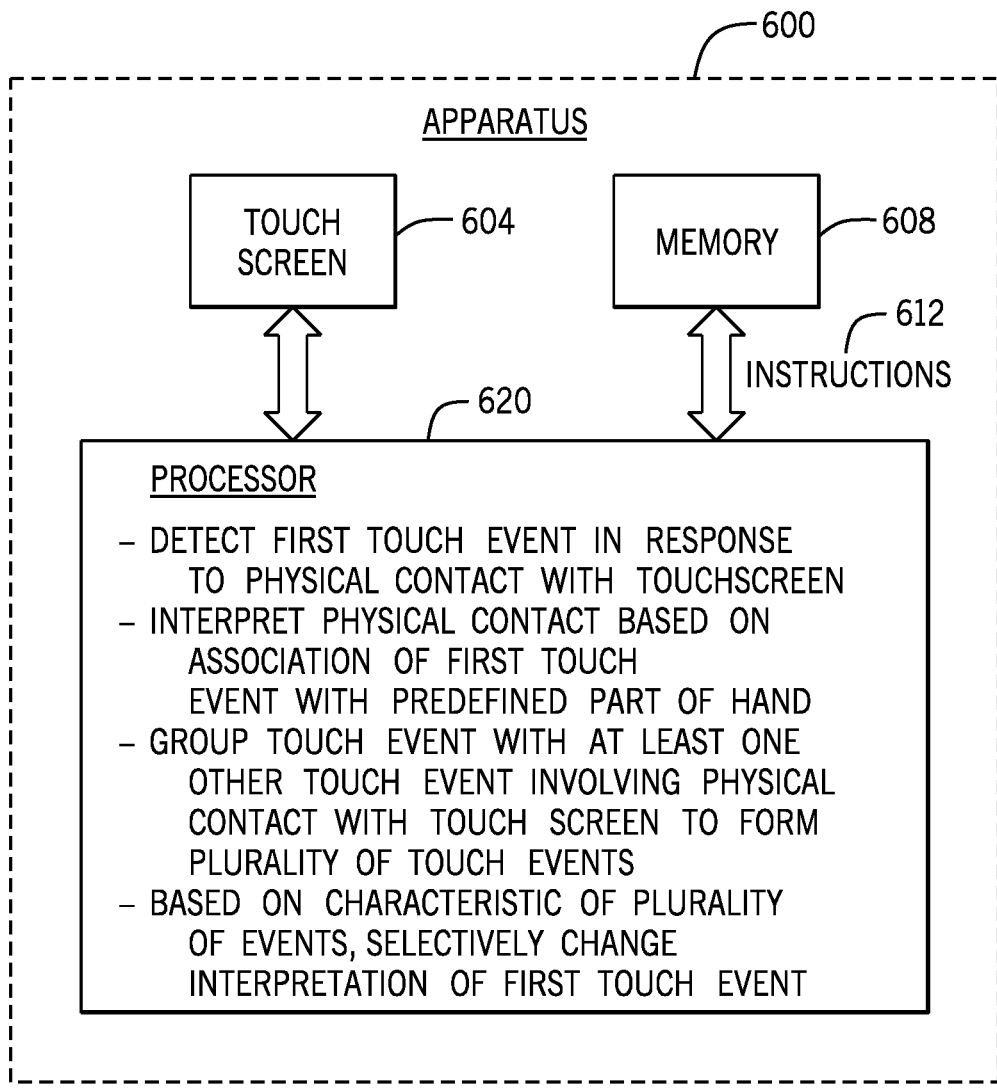
FIG. 6 is a schematic diagram of an apparatus to interpret a touch contact with a touch screen based on biometric and spatiotemporal information according to an example.

The input interface engine 120 is an example of a physical machine that is constructed to interpret touch contact based on biometric and spatiotemporal features associated with touch contacts. Thus, in accordance with example implementations, an apparatus 600 (see FIG. 6) may include a touch screen 604, a processor 620 and a memory 608 to store instructions 612. The instructions 612 when executed by the processor 620 cause the processor 620 to detect a first touch event in response to physical contact with the touch screen 604; associate the first touch event with a predefined part of a hand based on biometric data associated with hand; interpret the physical contact based on the association of the first touch event with the predefined part of the hand; group the first touch event with at least one other touch event involving contact with the touch screen to form a plurality of touch events; and based on a characteristic of the plurality of touch events, selectively changing the interpretation of the first touch event.

In accordance with example implementations, the processor 620 may include one or multiple central processing units (CPUs), one or multiple CPU cores, and so forth. In accordance with example implementations, the memory 608 may be a non-transitory memory that may be formed from, as examples, semiconductor storage devices, memristors, magnetic storage devices, phase change memory devices, a combination of one or more of these storage technologies, and so forth, depending on the particular implementation.

In accordance with further example implementations, all or part of the above-described processor-based architecture may be replaced by dedicated, hardware circuitry or by one or multiple Application Specific Integrated Circuits (ASICs). For example, in accordance with some implementations, the input interface engine 120 (FIG. 1) may be formed from one or multiple ASICs. Thus, many implementations are contemplated, which are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   sensing a first touch event on a touch sensitive surface of a computing device, wherein the first touch event is associated with a touch contact;
   identifying, by the computing device, a user based on user information;
   selecting, by the computing device based on the identified user, biometric information from a plurality of biometric information corresponding to different users;
   classifying, by the computing device, the touch contact as being a finger contact or a palm contact according to the selected biometric information upon the touch contact on the touch sensitive surface, the selected biometric information comprising biometric features based on a scanned image of ridge flows of a hand of the identified user;
   providing an input to the computing device based on the classification of the touch contact;
   associating the first touch event with a time sequence of touch events associated with the touch contact;
   based on a feature of the time sequence of touch events, selectively reclassifying, by the computing device, the touch contact; and
   selectively changing, by the computing device, the input based on a result of the selective reclassifying of the touch contact.

2. The method of claim 1, wherein:
   sensing the first touch event comprises receiving first data representing an image; and
   classifying the touch contact as being the finger contact or the palm contact comprises comparing the image to the scanned image of scanned the ridge flows of the hand.

3. The method of claim 1, wherein:
   the time sequence of touch events is associated with a motion; and
   selectively reclassifying the touch contact comprises selectively reclassifying the touch contact based on the motion.

4. The method of claim 1, wherein:
   each touch event of the time sequence of touch events is associated with a size; and
   selectively reclassifying the touch contact comprises selectively reclassifying the touch contact based on statistics of the size.

5. The method of claim 1, wherein selectively reclassifying the touch contact comprises selectively reclassifying the touch contact based on a number of the touch events of the time sequence of touch events.

6. The method of claim 1, further comprising determining whether the touch contact has ceased, wherein selectively reclassifying the touch contact comprises finalizing a classification of the touch contact in response to determining whether the touch contact has ceased.

7. The method of claim 1, further comprising:
   scanning the hand to produce the scanned image;
   classifying parts of the scanned image as being associated with either fingers of the hand or a palm of the hand; and
   storing data in the computing device representing the biometric information based on the classifying of the parts of the scanned image.

8. The method of claim 1, wherein the feature of the time sequence of touch events comprises a statistic derived from characteristics of the touch events of the time sequence of touch events.

9. The method of claim 1, wherein the user information comprises a login credential of the user, and wherein the user is identified based on the login credential.

10. The method of claim 1, wherein the identifying of the user is based on a biometric recognition of the user.

11. The method of claim 1, comprising:
    receiving, by the computing device, an image of the hand produced by a scanner;
    parsing, by the computing device, the image produced by the scanner into distinct hand regions to produce the biometric features.

12. An apparatus comprising:
    a touch screen;
    a processor; and
    a non-transitory storage medium storing instructions that when executed by the processor cause the processor to:
       detect a first touch event in response to physical contact with the touch screen;
       identify a user based on user information;
       select, based on the identified user, biometric information from a plurality of biometric information corresponding to different users;
       associate the first touch event with a predefined part of a hand of the user based on the selected biometric information upon the physical contact with the touch screen, the selected biometric information comprising biometric features based on a scanned image of ridge flows of the hand of the identified user;
       interpret the physical contact based on the association of the first touch event with the predefined part of the hand;
       group the first touch event with other touch events involving contact with the touch screen to form a plurality of touch events; and
       based on a characteristic of the plurality of touch events, selectively change the interpretation of the physical contact.

13. The apparatus of claim 12, wherein the plurality of touch events occur over a time window, and the instructions when executed by the processor cause the processor to evaluate the characteristic at different times associated with the time window.

14. The apparatus of claim 13, wherein the instructions when executed by the processor cause the processor to assign votes to the evaluations at the different times, and selectively change the interpretation of the physical contact based on the votes.

15. The apparatus of claim 13, wherein a touch event of the plurality of touch events occurs in time before the first touch event.

16. The apparatus of claim 12, wherein the identifying of the user is based on a biometric recognition of the user.

17. An article comprising a non-transitory computer readable storage medium comprising instructions that when executed by a computer cause the computer to:
- detect touch events with a touch sensitive surface of the computer, where each touch event is associated with a physical interaction with the touch sensitive surface;
- group the touch events into a plurality of event groups;
- identify a user based on user information;
- select, based on the identified user, biometric information from a plurality of biometric information corresponding to different users, the selected biometric information comprising biometric features based on a scanned image of ridge flows of a hand of the identified user;
- based on the selected biometric information, associate the plurality of event groups with parts of the hand upon the physical interaction with the touch sensitive surface;
- based on time and space relationships of the touch events, selectively revise the associations of the plurality of event groups with the parts of the hand; and
- based on the selectively revised associations, determine an input for the computer.

18. The article of claim 17, the non-transitory computer readable storage medium storing instructions that when executed by the computer cause the computer to, in response to associating a given touch event group with a palm contact, reject touch events associated with the given touch event group as providing input for the computer.

19. The article of claim 17, the non-transitory computer readable storage medium storing instructions that when executed by the computer cause the computer to:
- selectively determine statistics representing distances between touch events of a first event group of the plurality of event groups and touch events of a second event group of the plurality of event groups; and
- based on the statistics, selectively revise the associations of the plurality of event groups with the parts of the hand.

20. The article of claim 17, the non-transitory computer readable storage medium storing instructions that when executed by the computer cause the computer to:
- receive an image of the hand produced by a scanner;
- parse the image produced by the scanner into distinct hand regions to produce the biometric features.

* * * * *